(12) United States Patent
Guaraldi

(10) Patent No.: US 6,715,405 B2
(45) Date of Patent: Apr. 6, 2004

(54) DOMESTIC MACHINE TO MAKE CAPPUCCINO

(75) Inventor: Rino Guaraldi, Quartesana (IT)

(73) Assignee: Metallurgica Lux di Sgarbi & Chiozzi S.r.l., Ferrara (IT)

( * ) Notice: Subject to any disclaimer, the term of this patent is extended or adjusted under 35 U.S.C. 154(b) by 36 days.

(21) Appl. No.: 10/140,634

(22) Filed: May 7, 2002

(65) Prior Publication Data

US 2002/0166452 A1 Nov. 14, 2002

(30) Foreign Application Priority Data

May 9, 2001 (IT) ...................................... MI2001A0951

(51) Int. Cl.[7] .............................................. A47J 31/00
(52) U.S. Cl. ............................. 99/287; 99/290; 99/303
(58) Field of Search ........................ 99/303, 308, 310, 99/292, 302 R, 287, 290

(56) References Cited

U.S. PATENT DOCUMENTS

| | | | | |
|---|---|---|---|---|
| 3,368,476 A | * | 2/1968 | Mancioli | 99/303 |
| 4,498,375 A | * | 2/1985 | Bedini | 99/303 |
| 4,843,954 A | * | 7/1989 | Henn | 99/292 |

* cited by examiner

Primary Examiner—Reginald L. Alexander
(74) Attorney, Agent, or Firm—Akin Gump Stauss Hauer & Feld, L.L.P.

(57) ABSTRACT

A domestic machine for cappuccino includes a bottom vessel (A), enclosing a coffee holding funnel (B), screwed to a top container (C) provided with seal, filter and a central tube (D), for the upflow of the coffee, on which there is slidably put an outer tube (E) of greater diameter so as to obtain an interspace between the two tubes (D, E), the bottom end of the outer tube (E) carrying a filter (M) to emulsify the milk through a rapid reciprocating motion while the top end is closed by an automatic-opening valve (F) which puts the vessel (A) in communication with the outside when the machine begins to cool down.

6 Claims, 2 Drawing Sheets

DOMESTIC MACHINE TO MAKE CAPPUCCINO

BACKGROUND OF THE INVENTION

The present invention relates to domestic machines for preparing drinks, and in particular to a machine to make cappuccino.

It is known that in order to obtain a cappuccino-like drink in which a milk froth is placed on top of a coffee, barley coffee or the like there is normally used a steam jet to emulsify the milk. However it is clear that this is possible only with bar-type machines arranged for delivering such a steam jet and generally not available at home.

Therefore the object of the present invention is to provide a machine for domestic use which allows to easily obtain a cappuccino without resorting to steam jets.

BRIEF SUMMARY OF THE INVENTION

This object is achieved by means of a machine which in practice combines a coffeemaker with a frothing pot.

The main advantage of the present invention is exactly that of allowing to obtain a cappuccino with a very simple, compact and cheap machine which does not require a connection to the electrical network as conventional bar machines.

A further advantage of this machine stems from its structural and operational simplicity which allows to manufacture it at a low cost and to have it used by any user without any difficulty.

BRIEF DESCRIPTION OF THE SEVERAL VIEWS OF THE DRAWINGS

These and other advantages and characteristics of the machine according to the present invention will be clear to those skilled in the art from the following detailed description of an embodiment thereof, with reference to the annexed drawings wherein.

DETAILED DESCRIPTION OF THE INVENTION

With reference to said figures, there is seen that a machine for cappuccino according to the present invention includes a bottom vessel A, enclosing a coffee-holding funnel B, which is screwed to a top container C provided with seal, filter, handle (not illustrated) and a spout all the same as in a conventional coffee-maker.

Container C is provided with a central tube D, for the upflow of the coffee, on which there is slidably put an outer tube E of greater diameter so as to obtain an interspace between the two tubes. At the bottom end of tube E there is secured a filter M having a size slightly smaller than container C, while at the top end there is screwed a valve F.

Figure 1:
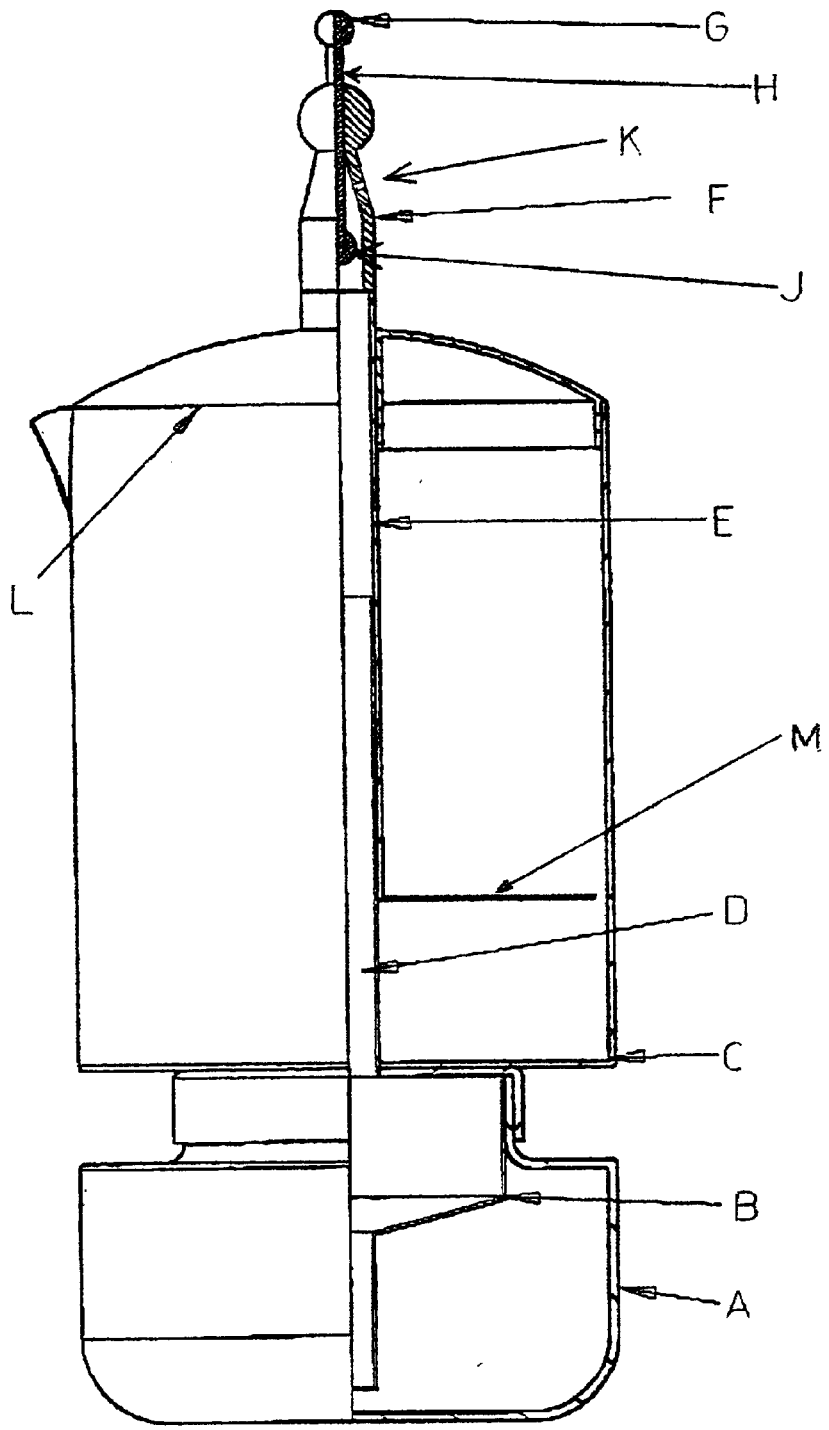
FIG. 1 is a semisectional side view of this machine.
Figure 2:
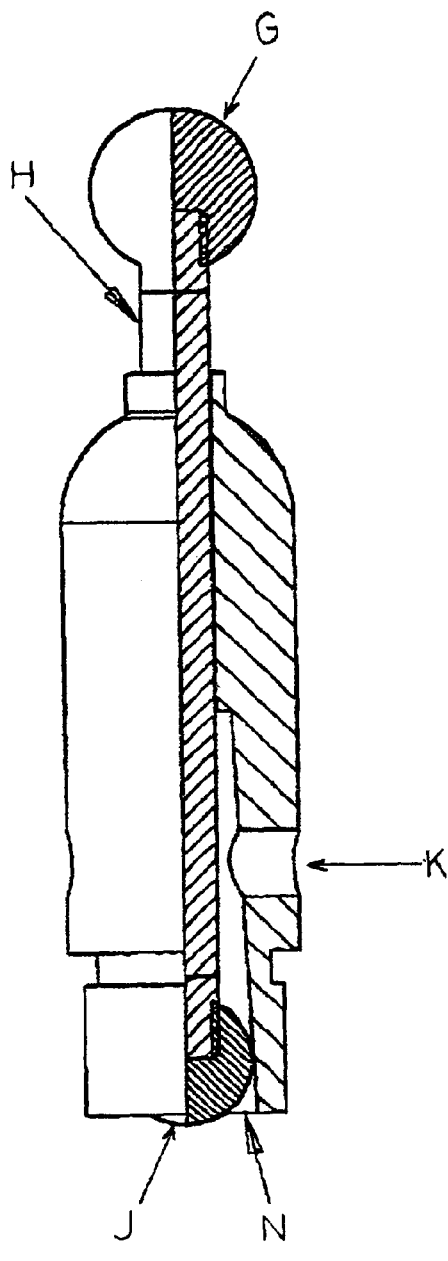
FIG. 2 is a semisectional enlarged view of a valve which can be used on the present machine, the valve being in a closed position.
Figure 3:
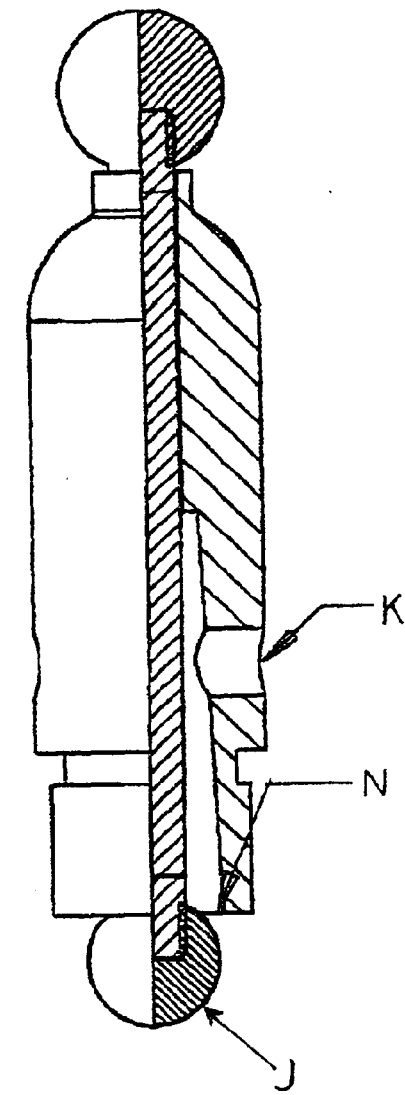
FIG. 3 is a view similar to the preceding one of the valve in the open position.

As better illustrated in the enlargements of FIG. 2 and 3, the above-mentioned valve is controlled through a knob G arranged at the top of a stem H which carries at its bottom end a sphere J. The internal profile of the valve at a side opening K is slightly conical (e.g. with a 3° slope), so that by pulling on knob G sphere J will obstruct mouth N thus achieving the airtight closure of the top end of the outer tube E.

The simple operation of the present cappuccino machine is readily understood from the description above.

To obtain the coffee it is sufficient to fill vessel A with water and the coffee-holder B with ground coffee and then screw them to the top container C as in a conventional espresso-type coffee-maker. Whereafter, a suitable amount of milk is poured into container C, lid L is closed, and the milk is emulsified to obtain the froth by moving filter M with a rapid vertical reciprocating motion by means of the outer tube E grasped through valve F. This movement allows air to be incorporated in the milk so as to obtain the typical cappuccino froth. At this stage the machine is ready to be placed on a heat source (e.g. gas or electric burner, or the like) upon closure of valve F by pulling knob G upwards as previously mentioned.

When the water reaches ebullition the coffee starts to climb up along the inner tube D and flows into the outer tube E, but this is closed at the top by valve F. As a consequence the coffee is forced to flow down in the interspace between the two tubes and gathers on the bottom of container C under the milk froth, thus obtaining the cappuccino ready to be served. Moreover when the water level in vessel A drops below the bottom end of the coffee-holder B, there is generated steam which climbs up to heat the drink in container C.

Once the heat source has been turned off and the machine begins to cool down, in vessel A there is generated a pressure-drop which tends to such back the drink. However this does not occur since said pressure-drop automatically causes the opening of valve F by pulling sphere J downwards, whereby vessel A is put into communication with the outside through opening K.

It is clear that the above-described and illustrated embodiment of the machine according to the invention is just an example susceptible of various modifications.

In particular, valve F can be made in other ways, for example by holding stem H in the closed position by means of a properly calibrated small spring rather than by wedging sphere J in the conical seat. Valve F could even be completely absent and be replaced by a simple cock, which the user must always keep closed and opens only after turning off the heat source and before the pressure-drop is generated in vessel A.

At most also the cock could be dispensed with and the outer tube E could simply be made closer at the top, in which case the user must serve the cappuccino before it is sucked back by the pressure-drop caused by cooling of vessel A.

What is claimed is:

1. Machine for cappuccino characterized in that it includes a bottom vessel (A), enclosing a coffee-holding funnel (B), connectable to a top container (C) provided with a central tube (D), for the upflow of the coffee, on which there is slidably put an outer tube (E) of greater diameter so as to obtain an interspace between said two central and outer tubes, the bottom end of said outer tube (E) carrying a filter (M) suitable to emulsify a liquid and the top end being closed.

2. Machine for cappuccino according to claim 1, characterized in that the top end of the outer tube (E) is closed by a closure device suitable to put the bottom vessel (A) in communication with the outside.

3. Machine for cappuccino according to claim 2, characterized in that the top end of the outer tube (E) is closed by an automatic valve (F) which opens when a pressure-drop is generated in the bottom vessel (A).

4. Machine for cappuccino according to claim 3, characterized in that the valve (F) can be closed by acting on a knob (G) arranged at the top of a stem (H) which carries at its bottom end a sphere (J) suitable to obstruct the mouth (N) of the valve by wedging into a conical seat.

5. Machine for cappuccino according to claim 3, characterized in that the valve (F) is kept in the close position by a spring supporting a sphere (J) suitable to obstruct the mouth (N) of the valve.

6. Machine for cappuccino according to claim 2, characterized in that the top end of the outer tube (E) is closed by a cock.

* * * * *